United States Patent [19]

Abe

[11] Patent Number: 5,130,791
[45] Date of Patent: Jul. 14, 1992

[54] COLOR IMAGE PROCESSING APPARATUS

[75] Inventor: Yoshinori Abe, Tama, Japan

[73] Assignee: Konica Corporation, Tokyo, Japan

[21] Appl. No.: 378,805

[22] Filed: Jul. 12, 1989

[30] Foreign Application Priority Data

Jul. 15, 1988 [JP] Japan .................................. 63-176750
Jul. 15, 1988 [JP] Japan .................................. 63-176751

[51] Int. Cl.[5] .............................................. H04N 1/46
[52] U.S. Cl. ......................................... 358/80; 358/75;
358/452; 358/453
[58] Field of Search ................ 358/80, 75, 453, 452,
358/458

[56] References Cited

U.S. PATENT DOCUMENTS

| 4,538,182 | 8/1985  | Saito et al.     | 358/80  |
|-----------|---------|------------------|---------|
| 4,623,917 | 11/1986 | Noguchi          | 358/80  |
| 4,720,750 | 1/1988  | Watanabe         | 358/453 |
| 4,847,689 | 7/1989  | Yamamoto et al.  | 358/75  |
| 4,929,979 | 5/1990  | Kimoto et al.    | 358/80  |
| 4,987,497 | 1/1991  | Yoshimura        | 358/453 |
| 5,016,096 | 5/1991  | Matsunawa et al. | 358/453 |

FOREIGN PATENT DOCUMENTS

| 251278 | 1/1988 | European Pat. Off. |
| 268499 | 5/1988 | European Pat. Off. |
| 270090 | 6/1988 | European Pat. Off. |
| 300046 | 1/1989 | European Pat. Off. |

Primary Examiner—James J. Groody
Assistant Examiner—Michael H. Lee
Attorney, Agent, or Firm—Finnegan, Henderson, Farabow, Garrett and Dunner

[57] ABSTRACT

Disclosed is an image processing apparatus for processing a color image signal obtained by converting color image information on a document into an electric signal. In the apparatus, a marking color of a coloring material different from the color of the document is detected. When the color of the document adjoins to the marked region, at least a part of the color of the document is changed to the color of the marked region.

2 Claims, 16 Drawing Sheets

FIG. 2
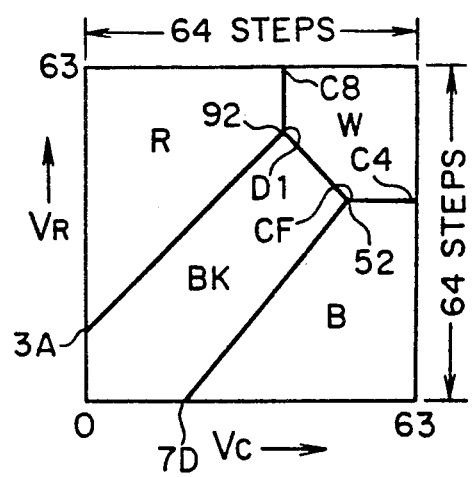
FIG. 3
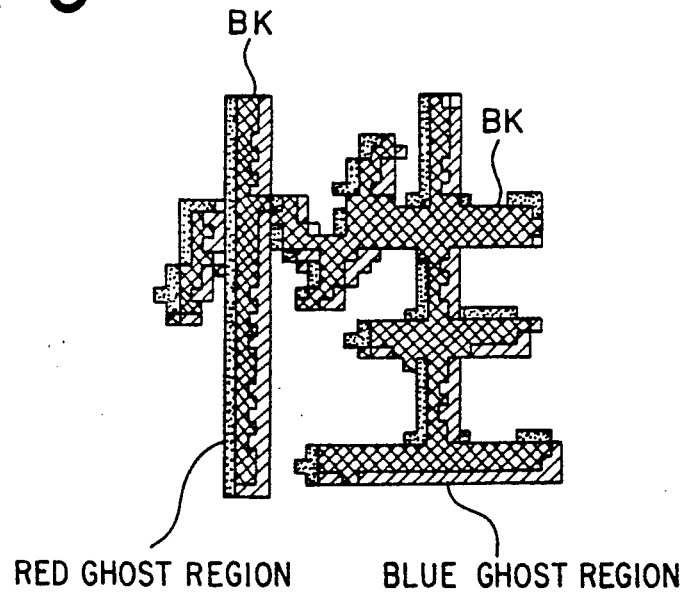
RED GHOST REGION    BLUE GHOST REGION
FIG. 4A          FIG. 4B         FIG. 4C
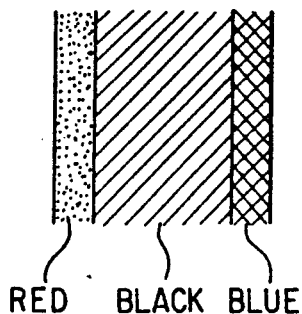   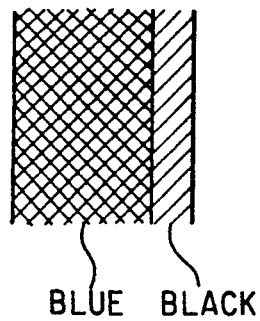   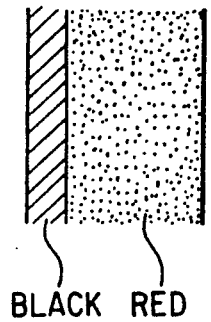
RED  BLACK  BLUE     BLUE  BLACK      BLACK  RED

FIG. 5

| No. | COLOR PATTERNS | TARGET PIXEL CHANGE |
|---|---|---|
| 1 | WHITE WHITE BLUE BLUE BLACK BLACK BLACK | BLUE → BLACK |
| 2 | WHITE WHITE BLUE BLUE BLUE WHITE WHITE | BLUE → BLUE |
| 3 | WHITE WHITE WHITE RED BLACK BLACK BLACK | RED → BLACK |
| 4 | WHITE WHITE RED RED RED WHITE WHITE | RED → RED |

PERIPHERAL PIXELS — TARGET PIXEL — PERIPHERAL PIXELS

FIG. 6

| N | M | COLOR PATTERNS | PATTERN SIZE |
|---|---|---|---|
| 2 (WHITE BLACK) | 3 | 8 | 1 × 3 |
|  | 5 | 32 | 1 × 5 |
|  | 7 | 128 | 1 × 7 |
| 3 (WHITE BLACK RED) | 3 | 27 | 1 × 3 |
|  | 5 | 243 | 1 × 5 |
|  | 7 | 2187 | 1 × 7 |
| 4 (WHITE BLACK RED BLUE) | 3 | 64 | 1 × 3 |
|  | 5 | 1024 | 1 × 5 |
|  | 7 | 16384 | 1 × 7 |
|  | 9 | 262144 | 3 × 3 , 1 × 9 |

FIG. 10a

| No. 8 | 7 | 6 | 5 | 4 | 3 | 2 | 1 | Target Pixel Change |
|---|---|---|---|---|---|---|---|---|
| BLACK | RED | X | X | X | X | X | X | BLACK → RED |
| BLACK | BLACK | RED | X | X | X | X | X | |
| BLACK | BLACK | BLACK | RED | X | X | X | X | |
| BLACK | BLACK | BLACK | BLACK | RED | X | X | X | |
| BLACK | BLACK | BLACK | BLACK | BLACK | RED | X | X | |
| BLACK | BLACK | BLACK | BLACK | BLACK | BLACK | RED | X | |
| BLACK | BLACK | BLACK | BLACK | BLACK | BLACK | BLACK | RED | |

Input Color Pixels — Target Pixel — Color Marker

FIG. 10b

| No. | 7 | 6 | 5 | 4 | 3 | 2 | 1 | TARGET PIXEL CHANGE |
|---|---|---|---|---|---|---|---|---|
| | X | X | X | X | X | RED | BLACK | BLACK SURROUNDED BY A MARKER IS CHANGED TO RED. |
| | X | X | X | X | RED | BLACK | RED | |
| | X | X | X | RED | BLACK | BLACK | RED | BLACK → RED |
| | X | X | RED | BLACK | BLACK | BLACK | RED | |
| | X | RED | BLACK | BLACK | BLACK | BLACK | RED | |
| | RED | BLACK | BLACK | BLACK | BLACK | BLACK | RED | |
| | BLACK | BLACK | BLACK | BLACK | BLACK | BLACK | RED | |
| 8 | RED | BLACK | BLACK | BLACK | BLACK | BLACK | RED | |

INPUT COLOR PIXELS

COLOR MARKER
TARGET PIXEL
COLOR MARKER

60 : REGION EXTRACTING CIRCUIT

600: MARKER CORRECTION CIRCUIT

501: MARKER DETECTING CIRCUIT

| COLOR CODE | | COLOR |
|---|---|---|
| 0 | 0 | BLACK |
| 0 | 1 | BLUE |
| 1 | 0 | RED |
| 1 | 1 | WHITE |

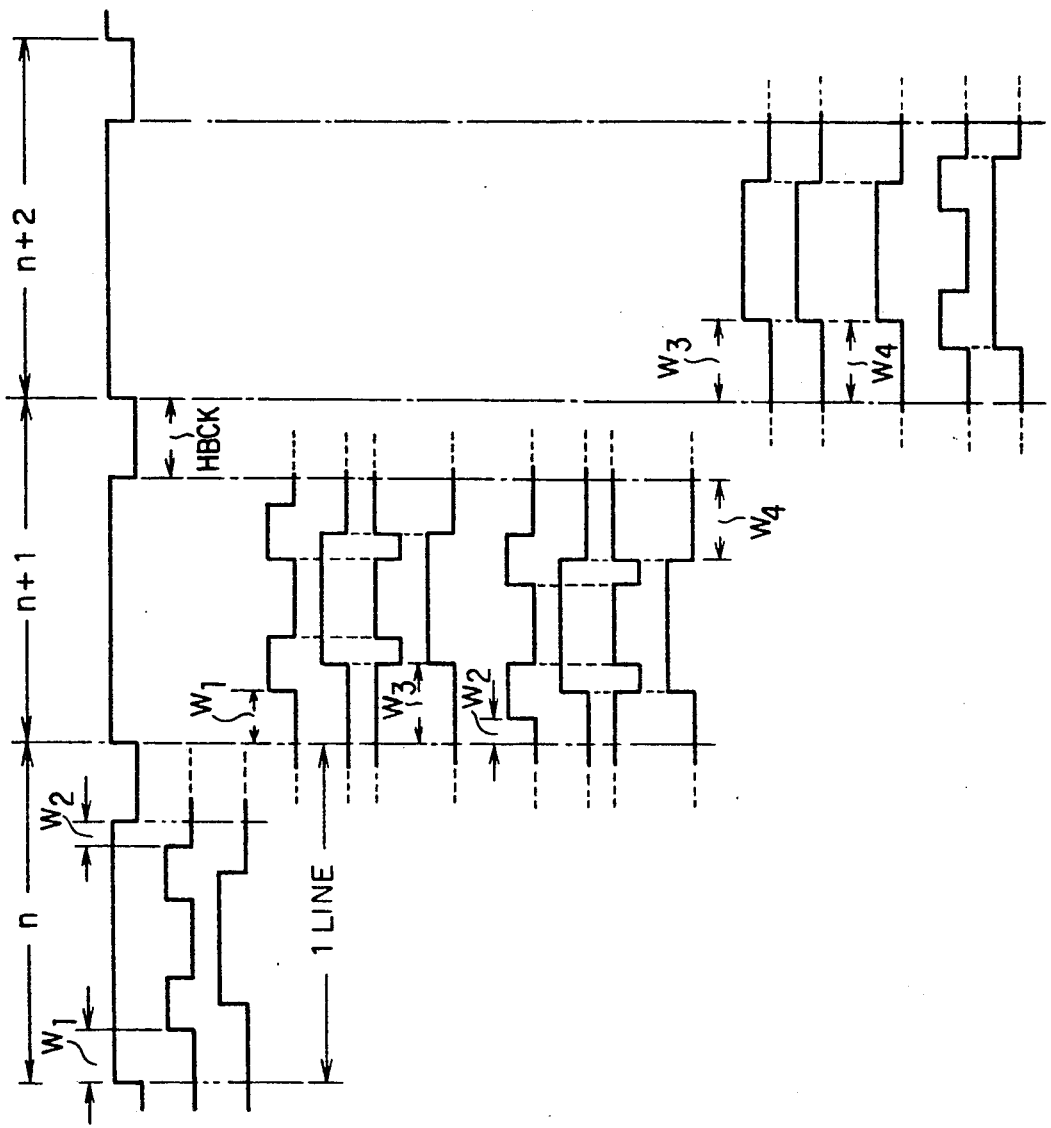

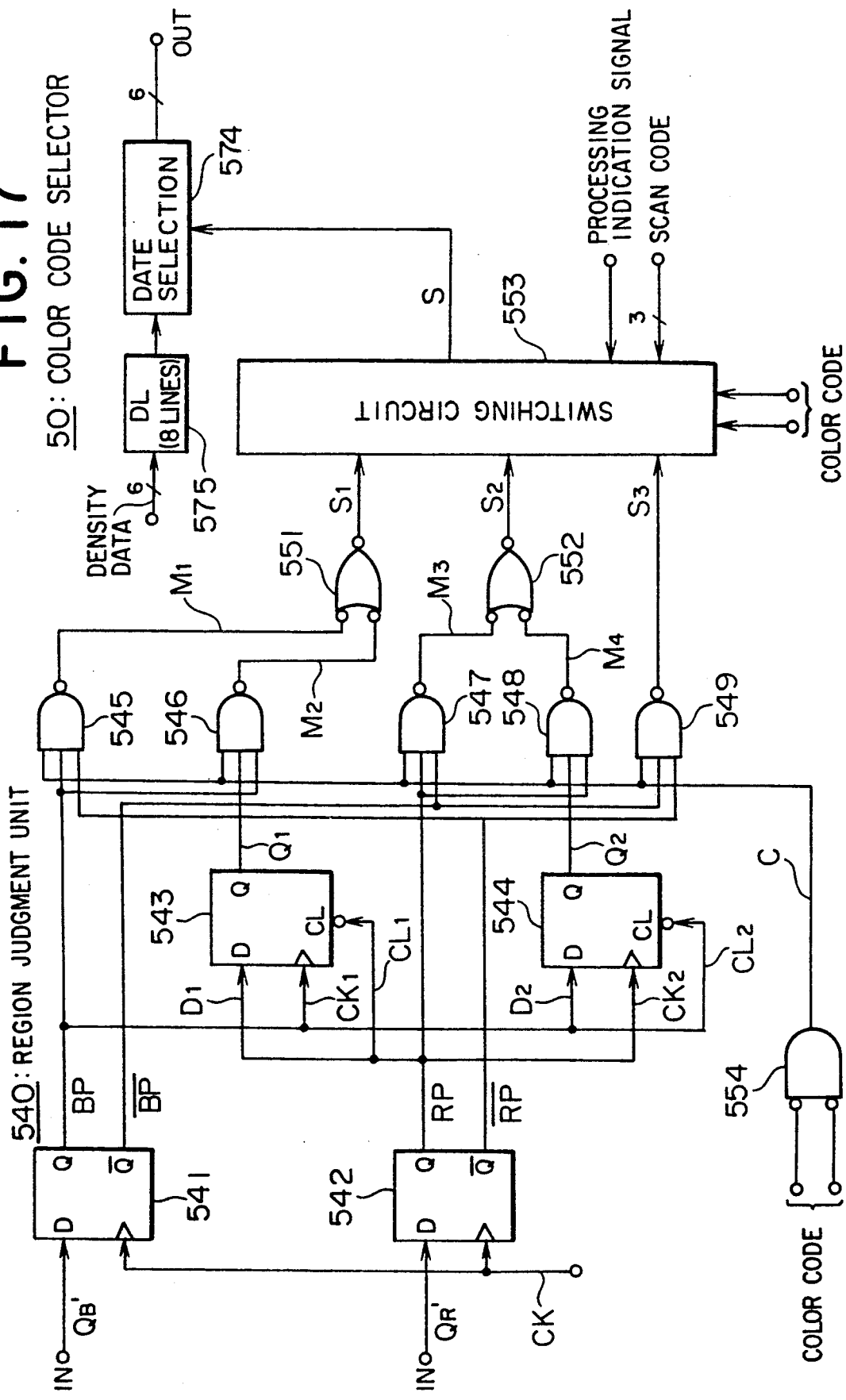

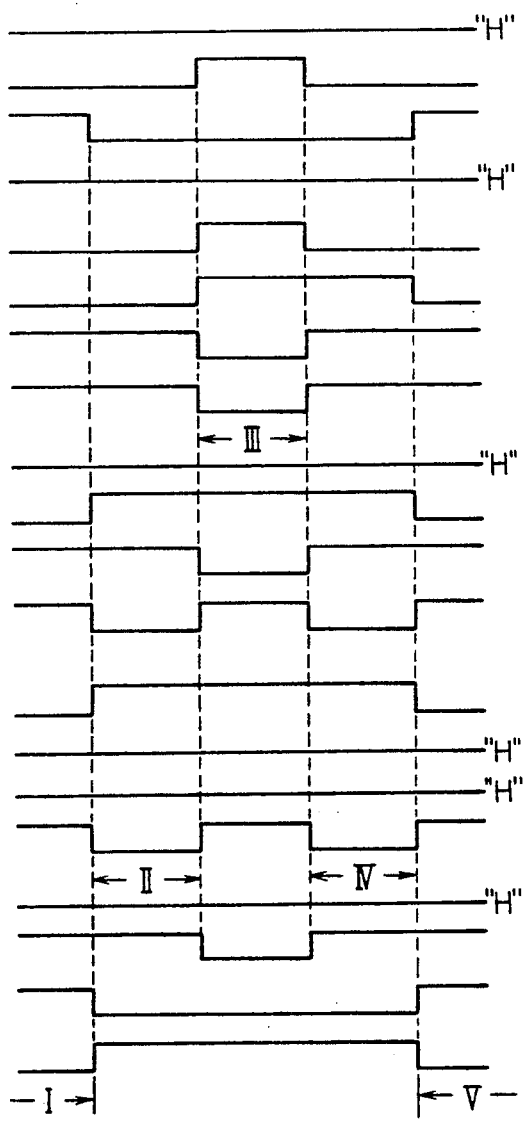

FIG. 18A BLACK COLOR CODE C
FIG. 18B BLUE REGION SIGNAL BP
FIG. 18C RED REGION SIGNAL $\overline{RP}$
FIG. 18D THE FIRST NAND OUTPUT $M_1$
FIG. 18E BLUE REGION SIGNAL BP
FIG. 18F FF OUTPUT $Q_1$
FIG. 18G THE SECOND NAND OUTPUT $M_2$
FIG. 18H BLUE GATE SIGNAL $S_1$
FIG. 18I BLACK COLOR CODE C
FIG. 18J RED REGION SIGNAL RP
FIG. 18K BLUE REGION SIGNAL $\overline{BP}$
FIG. 18L THE THIRD NAND OUTPUT $M_3$
FIG. 18M RED REGION SIGNAL RP
FIG. 18N FF OUTPUT $Q_2$
FIG. 18O THE FOURTH NAND OUTPUT $M_4$
FIG. 18P RED GATE SIGNAL $S_2$
FIG. 18Q BLACK COLOR CODE C
FIG. 18R BLUE REGION SIGNAL $\overline{BP}$
FIG. 18S RED REGION SIGNAL $\overline{RP}$
FIG. 18T BLACK GATE SIGNAL $S_3$

COLOR IMAGE PROCESSING APPARATUS

BACKGROUND OF THE INVENTION

The present invention relates to a color image processing apparatus which is peculiarly well fitted for an image processing apparatus such as a color copier in which a plain paper is used as a recording paper. The invention especially relates to a color image processing apparatus in which the region designating information can be accurately detected.

In a color image processing apparatus such as a color copier in which laser beams are used, color image information is obtained by dissolving plural colors on a color document, and color images are recorded according to the color image information.

A color copier of this kind is designed and made so that it can conduct various image processes such as variable magnification processing and partial color conversion processing.

With partial color conversion processing an image compiling process in which the color image information inside or outside the designated region can be recorded by the color by which the region is designated.

Designation of the region is usually conducted by a color marker. For instance, when the region a is designated by a blue marker as shown in FIG. 20A, the image within the region a is recorded by the color which was used to designate the region, which is blue in this example. Refer to FIG. 20B.

If the image in another region can be erased, the images in the region can be recorded as black and white images.

In order to attain the partial color conversion mode, it is necessary to detect the color of a color marker used to designate the region. As shown in FIG. 21, the marker signals BP, RP are detected from the color marker with scanning lines (n, n+1, and so forth) and at the same time the region signals OB', QR' are generated by the process.

According to these marker signals BP, RP and the region signals QB', QR', the images in the designated region are extracted and recorded and the recording process shown in FIG. 20B is attained.

To change the subject slightly, in this type of color image processing apparatus equipped with the partial color conversion processing function, the apparatus can not convert colors within the designated region correctly unless the image information of a document and that of a color marker are discriminated accurately.

Especially when a color marker and document image overlap, for instance, when a black longitudinal or lateral ruled line crosses the image, the color marker is drawn on the ruled line. As a result, the information obtained is not color marker information, but document image information.

For example, at the position where the black ruled line and the color marker cross as shown in FIG. 22A and FIG. 22B, the color mark's information is obtained in the edges of both sides of the crossing area contour, but the color mark information can not be obtained within the crossing area.

Accordingly, the color marker information is broken off at this crossing area and the color conversion processing is not properly conducted there.

According to the present invention, a color image processing apparatus is equipped with a partial color conversion processing function, which can detect the color marker accurately.

In order to solve the problems mentioned above, the present invention has the following characteristics. A color image processing apparatus in which color image information converted to an electric signal is processed, comprises a color discriminating means; a color ghost correction means; an image processing means by which an image processing of a designated region is conducted according to color information different from the color of a document to be read out and at least a part of the color information of the document which comes into contact with the region designating color information, is changed to the color information to designate the region. Another characteristic of the image processing apparatus of the present invention is explained as follows. In the image processing apparatus mentioned above, the document color information sandwiched between the color information which designates the region, can be changed to the information to designate the region.

The marker correction circuit 600 is installed in order to accurately detect the color marker region. Refer to FIG. 12.

In the marker correction circuit 600, the image data of a single pixel which corresponds to several pixels or several lines, is referred. If the color information comes into contact with the color marker information to designate the region, this color information is changed to the color marker information. In other words, data is replaced. Furthermore, when there exists document color information sandwiched between the color marker information, the sandwiched document color information is changed to the color marker information.

For the purpose of processing data as explained above, the color information correcting table is provided in the marker correction circuit 600. When the color information combined as explained above, is input, the target pixel is changed to the color information of the color marker. Refer to FIG. 10.

After the target pixel is changed to the color information of the color marker, even in the case when the image information of the document crosses the color marker, the color marker data does not break. Therefore, the designated region can be accurately detected.

BRIEF DESCRIPTION OF THE DRAWINGS

FIG. 2 is a color discriminating map.

FIG. 3 and FIGS. 4A-4C are schematic illustrations of color ghosts.

FIG. 5 and FIG. 6 are schematic illustrations of color ghost correction.

FIG. 7A-7B and FIGS. 8A-3B are characteristic charts which show MTF correction.

FIGS. 10A-10B are schematic illustration which shows the state of changing color markers.

FIG. 16A–16P are wave form chart to explain the action of the region extracting unit.

FIG. 17 is a system diagram of the color data selector.

FIG. 18A–18T are wave form charts to explain the action of the color code selector.

DETAILED DESCRIPTION OF THE INVENTION

Figure 1:
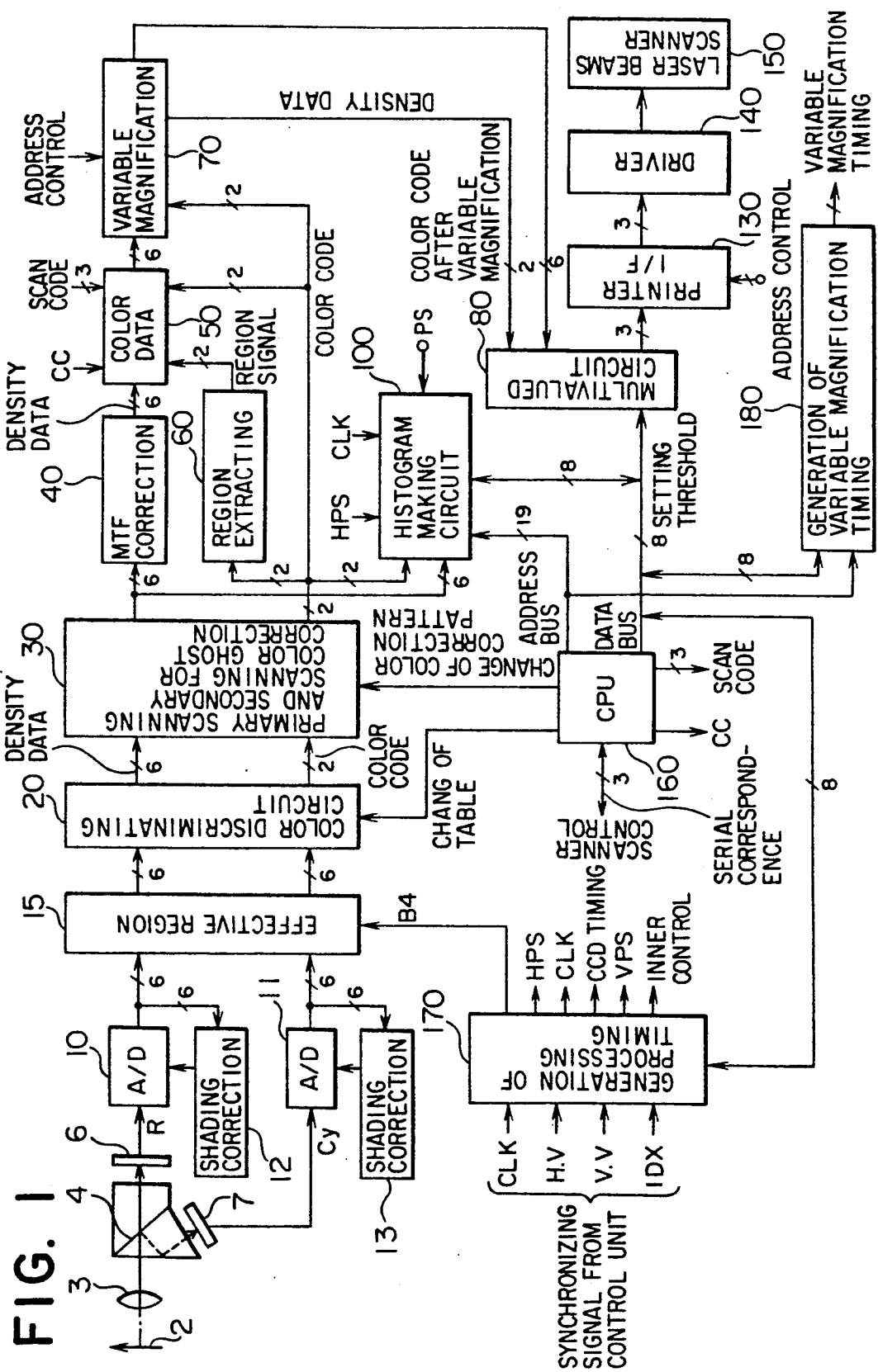
FIG. 1 is a block diagram of an example of color image processing apparatuses of the present invention.

Referring first to FIG. 1 and the following drawings, an example of the color image processing apparatus related to the present invention which is applied to a color copy machine is explained.

The configuration of the color image processing apparatus is presented in FIG. 1.

The color image information, in other words optical image information, on the document and another subject 2 is separated into two color separation images by the dichroic mirror 4 through the optical system 3. In this example, color image information is separated into red R and cyan Cy color separation images. This color separation is conducted by use of the dichroic mirror 4 having a cut off range of 540 to 600 mm.

Red R and cyan Cy color separation images are supplied to such image reading units as CCDs 6 and 7 through which image signals of red component R and cyan component Cy are provided.

Image signals R and Cy are supplied to analog/digital converters 10 and 11 where they are converted into digital signals with predetermined bits, 6 bits in this example. At the time shading correction is conducted. The numerals 12 and 13 show shading correction circuits.

In effective area extracting circuits 15, digital image signals subjected to shading correction within the maximum document size are extracted they are supplied to the color discrimination circuit 20 of the next stage. For documents of B4 size, the size signal B4 produced by the system timing signal forming means 170 is used as a gate signal.

Assuming that shaded digital image signals are VR and VC, VR and VC are supplied into the color separating circuit or color discriminating circuit 20 where they are discriminated as one of multiple color signals. This example shows a configuration to discriminate an image signal as one of the color signals: red, blue and black. Namely, possible colors of original images on a document are respectively discriminated per pixel as one of predetermined colors such as red, blue or black. Through this discriminating operation, the document is deemed to consist of images whose color is one of red, blue or black colors. In this example, the above predetermined colors are determined as red, blue and black color on the basis of recording colors of a recording apparatus, however, it is possible to use more than four colors including those three colors.

Each discriminated color signal consists of color code data, which is 2-bit data, and density data, which is 6-bit data. Data of each color signal, stored in the color discrimination converting table or map constituted with ROM, is used for example.

FIG. 2 is one of the examples of the color discrimination maps. The system can be organized so that a plurality of color discrimination converting tables are prepared and one out of these is chosen according to the record mode for example. In this case, the table is chosen by a signal from a microcomputer which will be explained later.

Color discriminated image data is transferred to the color image processing step.

First of all, the image data is supplied to the color ghost correction means 30 of the next stage where color ghost correction is conducted in the primary scanning direction, in other words, in the horizontal scanning direction, and in the secondary scanning direction, or in the drum revolution direction.

This color ghost correction is made to prevent undesirable color ghost around letters, especially black letters, during color separation, in other words, color discrimination.

An example of a color ghost is shown in FIG. 3.

FIG. 3 explains how color ghosts appear after a black Japanese letter "性" (sei, gender) was photographed and its color was discriminated.

It is clear from these examples that red and blue ghost appears on the edge of a black line, black ghost appears on the edge of a blue line, and black ghost appears on the edge of a red line. It is clear that the color ghost appearance differs from that of the example in the case of other color combinations.

The color ghost correction means 30 is a circuit to which corrects the above-mentioned color ghost as much as possible. The color ghost correction processing aims at only the color code data.

To eliminate color ghost, the color pattern method is used since fixed color ghost appears for the original color, for example:

Original: Black—Color ghost: Red and blue
Original: Red, blue—Color ghost: Black with the color pattern method, the original color can be identified by knowing how a color for a certain pixel and those for its surrounding pixels appears (pattern).

FIG. 5 shows an example which determines the color pattern of the target pixel and its surrounding pixels, and the color of the target pixel to be determined at that time.

For No. 1 which has a color pattern of white and black at its edge, the blue color of that pixel is assumed to be color ghost produced at the black edge. Likewise, for No. 3, red is assumed to be color ghost of black color. Accordingly, for Nos. 1 and 2, that pixel color is changed from blue or red to black.

On the other hand, for Nos. 2 and 4, no color ghost occurrence is assumed, and the color of that pixel is directly output without being changed.

It is difficult to implement such processing by use of an arithmetic circuit. In effect, this example uses LUT (look-up table) in ROM form. One or two-dimensional systems can be used for the color pattern. Assuming that the number of colors is N and the number of surrounding pixels including that pixel is M, the number of color pattern is:

$N^M$

This means that use of the 2-dimensional system increase drastically with an increase in M and is not practical. In other words, use of the 2-dimensional system can provide less surrounding pixels in both primary and secondary directions, with demand for more patterns.

FIG. 6 indicates the relationship between size and color pattern.

This example uses single-dimensional color patterns of a size of $1 \times 7$ (N=4, M=7) and conducts color ghost elimination in the primary scan direction and in the secondary scan direction, independently. Since there is no difference between color ghost appearance in the primary direction and the secondary direction, the example uses the same color pattern both in the primary scan direction and secondary direction.

This example uses a color pattern with a size of $1 \times 7$, as described above; however, use of color patterns with smaller sizes, like one with $1 \times 5$, is possible. The color pattern with a size of $1 \times 5$ can eliminate color ghost of a single pixel, while the color pattern with a size of $1 \times 7$ can eliminate color ghost of two pixels.

If a color pattern with a size of 133 7 is used, the color code is entered as an ROM address. For a color pattern such as :

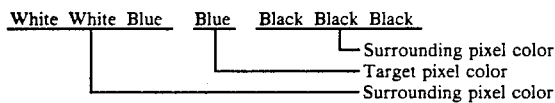

the color pattern is thus:

| White | White | Blue | Blue | Black | Black | Black |
|-------|-------|------|------|-------|-------|-------|
| 11 | 11 | 01 | 01 | 00 | 00 | 00 |

And the address is:

D40 As shown in FIG. 5, the address contains the black code: 00 By use of this, table look-up work is made.

Since a 14-bit address is required for a pattern of $1 \times 7$, a bipolar ROM should meet the demand for entry of an address of 14 bits and a color code of 2 bits. However, bipolar ROMs with such a large capacity cannot be easily found and would be very expensive. The output of ROM is generally 8-bit.

The working example shows the case where ROM is searched by the first one pixel, and six other pixel codes are used to perform table look-up work. The output data of ROM, $D_0$, $D_1$, is searched when the lead pixel is black. Similarly, the output data, $D_2$, $D_3$ is searched when the lead pixel is blue. The output data, $D_4$, $D_5$ is searched when the lead pixel is red. The output data, $D_6$, $D_7$ is searched when the lead pixel is white.

Therefore, as the lead pixel is white in the color pattern in FIG. 5, both of bit $D_4$ and bit $D_7$ out of the output of ROM are searched. But even if the lead pixel is white and the output bit $D_6$, $D_7$ is searched, the target pixel color codes are different from each other as shown in FIG. 5. The reason is that the ROM addresses to be referred to are different from each other according to the combination of pixels to be input. In this case, the combination of pixels means the combination of color data codes.

In the case of a slow speed and big capacity in which EPROM is used, it is possible to transmit the necessary data to plural SRAM before operation and conduct color ghost correction with this SRAM.

First of all, the image data after color ghost correction was made, which consists of the color code data and the density data, is processed in the resolution correction circuit 40. The density data is processed and the resolution, which is called MTF, is corrected.

The factors which deteriorate resolution are problems in the optical system, the optical running system, the signal processing system, and the recording system. The optical system and the optical running system among others, directly influence deterioration of resolution.

Figure 7A:
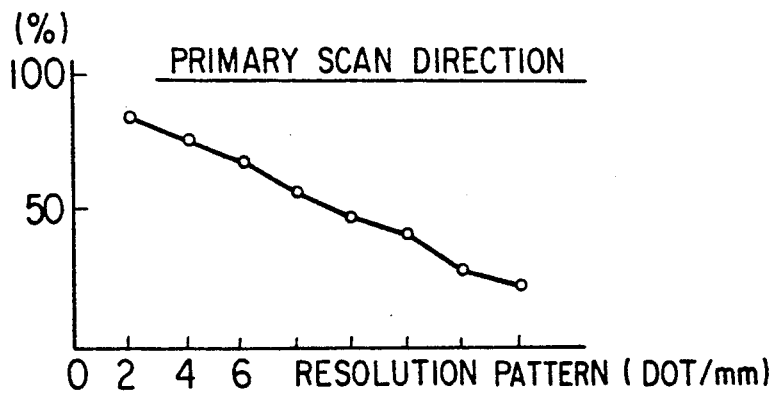
Figure 7B:
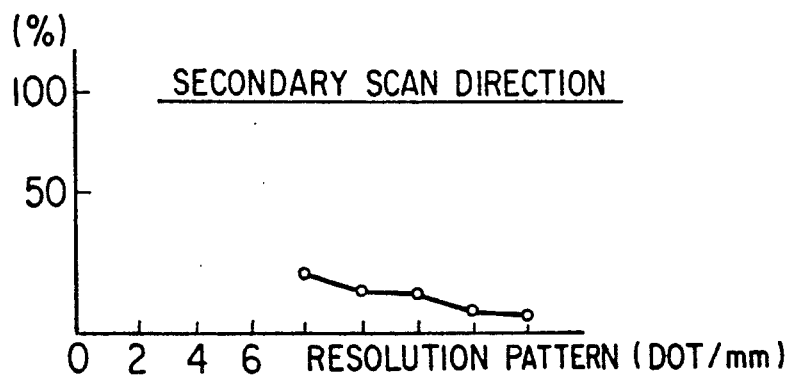

FIG. 7 represents MFT values of the primary scanning direction and the secondary scanning direction before resolution correction was made. The data shown in the charts is the result of measurements made when a black and white image pattern with spatial frequency from 2 dots/mm to 16 dots/mm was scanned.

In this case, MTF has been defined as follows:

$$MTF = (W-BK)/(W+BK) \ (\%)$$

where W indicates white signal, and BK, black signal.

Deterioration in MTF is more obvious in the secondary scan direction than in the primary scan direction. To perform correction to a similar extent in the invention, the amount of correction in the secondary scanning direction is preferably adjusted to be twice to four times as much as that in the primary direction.

For a resolution means to perform correction to a similar extent in both directions, the primary scan direction and the secondary scan direction, while keeping satisfactory reproduction of fine lines, the resolution correction means is constituted by adopting a convolution filter with $3 \times 3$ pixel.

Figure 8A:
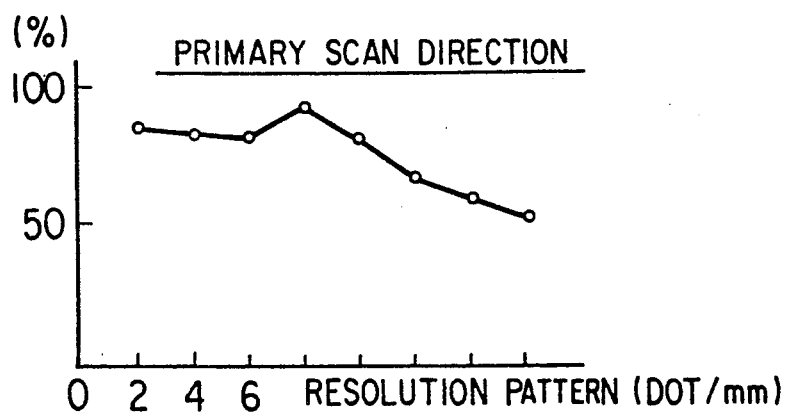
Figure 8B:
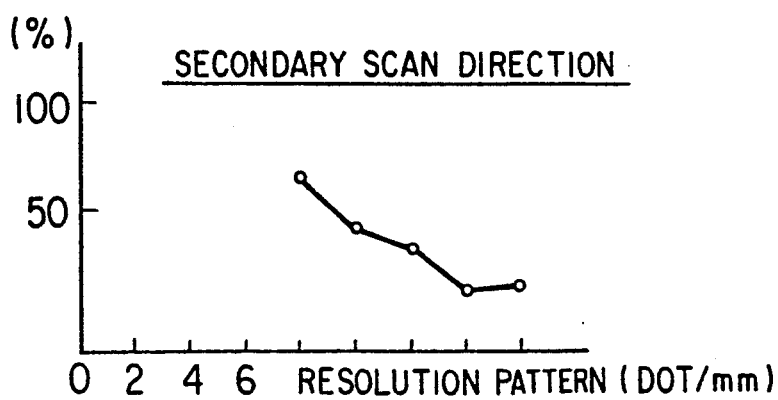

A convolution filter was used in the example, and the results of the correction are shown in FIG. 8.

The density data and color code data after the resolution was corrected, are supplied to the color data selector 50, and when the partial color conversion mode is selected, the image region is recorded with a specific color.

When image processes such as partial color conversion mode and so forth are conducted, the color marker on the document must be detected and the region must be extracted and designated.

That is the reason why the region extract circuit 60 is installed in the apparatus and the color marker region on the document is detected. The region signals QR' and QB' which are obtained by this detection are supplied to the data selector 50. Please refer to FIG. 21 as far as this matter is concerned.

In addition to these signals, the scan code signal which indicates the color in which images are being copied at the present time and the partial color conversion signal CC are respectively supplied to the data selector 50.

The scan code signal indicates the color in which the image is being developed at the present time. In the case of a multicolor copy machine, which can record a plurality of specific colors, a color at every revolution of the photoreceptor is developed, and the images on the photoreceptor are transferred to a recording paper after all the colors have been developed.

Accordingly, when a blue marker is detected, it indicates that the machine is set to blue color copy sequence. If the necessary color data is output when the region signal is obtained, the images within the blue color marker are recorded in blue color.

When the copy machine is not set to partial color conversion mode, only color code data which accords with the scan code is sent, and the density data is output.

To explain it in more detail, in the case where the apparatus is set to red color copy sequence, the necessary density data is selectively output only when the red color code is obtained.

The image data, in other words the density data, which was output from the color data selector 50, is magnified or reduced by the variable magnification circuit 70.

Magnifying and reducing processes are conducted as follows. The density data is interpolated in the primary scan direction and the scan speed is controlled in the secondary scan direction, in other words the photoreceptor rotating direction.

If the scan speed is increased, the sampling data in the secondary scan direction is thinned out. So, the images are reduced. On the contrary, if the scan speed is decreased, the images are magnified.

In this example, the color code data is simultaneously magnified or reduced, then it is supplied to the multivalued circuit 80.

The density data which has undergone the magnifying process or reducing process explained above, undergoes a multivalue process. For instance, 6-bit density data is converted to pentad digitized values by using four thresholds.

The threshold data is set manually or automatically.

In order to determine the threshold data automatically, the histogram making circuit 100 is installed.

Figure 9:
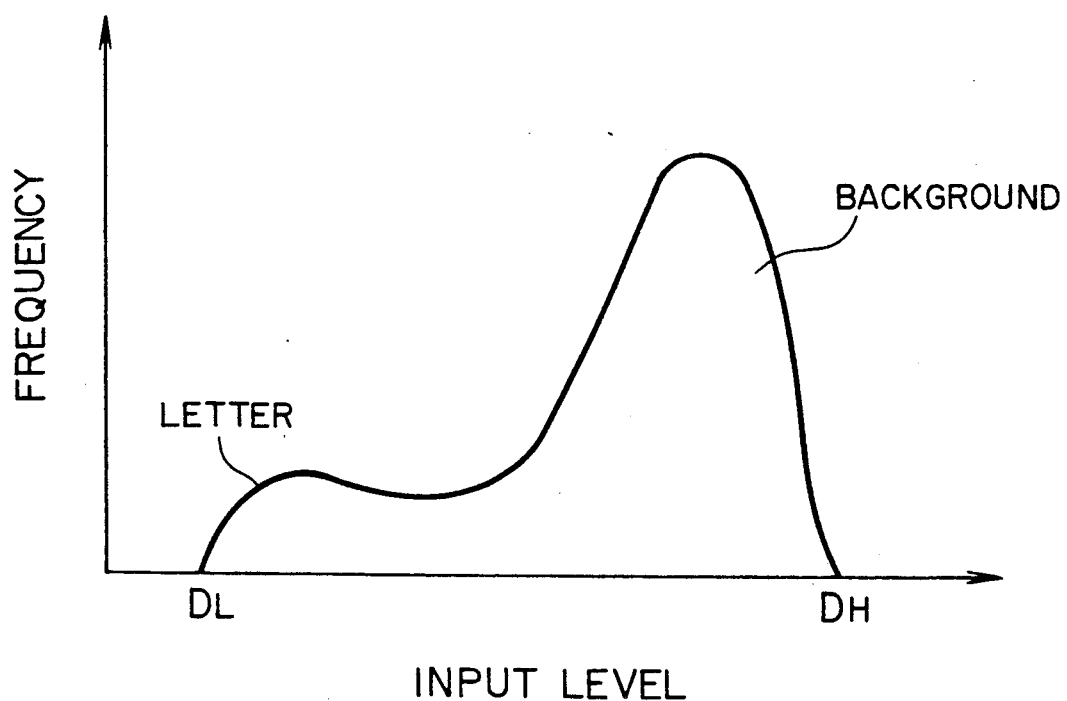
FIG. 9 is a histogram which shows density.

The density histogram shown in FIG. 9 is made from the histogram making circuit 100 or the image data obtained. The most adequate threshold data to the image is computed according to the density histogram.

It is possible to make a density histogram of each color and conduct multivalue processing by the computed data according to the histogram.

The multivalued 3-bit density data is supplied to the driver 140 through the interface circuit 130.

Laser beams are modulated in accordance with the multivalued data at the driver 140. In this example, it is PWM-modulated.

The driver 140 can be built in the multivalue circuit 80.

Latent images are formed by PWM-modulated laser beams on a photoreceptor drum which is installed in the output unit 150.

An electrophotographic color copier in which laser beams are used, is applied to the output unit 150. In this example, two component non-contact development, as well as reversal development, is adopted.

Namely, the image transfer drum which has been used in the conventional color image forming method, is not used in this case. In order to make the machine compact, three color images consisting of blue, red and black, are developed on an image forming OPC photoreceptor drum while the drum rotates three times. After development, the images are transferred on a plain recording paper.

Various kinds of directions of image forming and timing of image forming are all controlled by CPU 160.

The numeral 170 is a timing signal generating circuit by which various timing can be obtained. The horizontal and vertical synchronizing signals, HV, VV related to the primary and secondary scan directions which are sent from the output unit 150 including the clock CLK and the index signal, IDX which indicates the start of scanning by laser beams, are supplied to the timing signal generating circuit. According to these signals, the timing signal to start reading CCD 6, 7 is determined.

The numeral 180 is a timing signal generating circuit to produce a variable magnification signal.

Figure 22A:
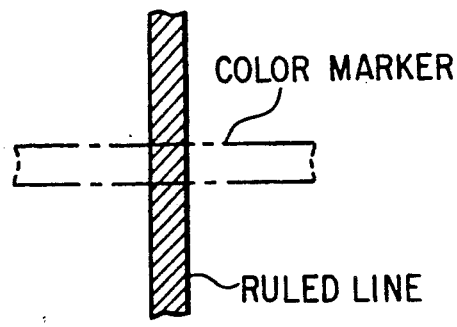
FIG. 22 is a magnified drawing of the color marker.
Figure 22B:
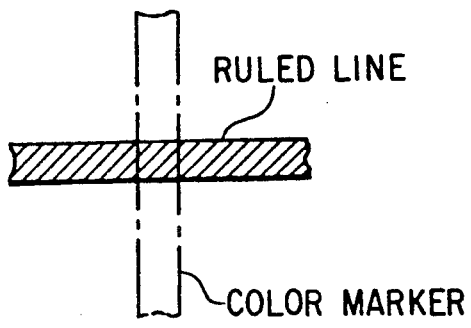

In the present invention, when the partial color conversion mode is selected and a region on the document is designated by a color marker, wherein the color marker crosses a ruled line as shown in FIG. 22, the apparatus automatically detects the crossing area and changes the image data to the color information of the color marker.

In the document image information, for instance, in the case in which a ruled line and a color marker cross each other, color marker information which corresponds to at least a pixel exists. Refer to FIG. 22. The color information corresponding to the portion of at least several pixels which is different from the color information mentioned above, is continuously detected from the color marker information.

For example, when the color marker crosses a ruled line as shown in FIG. 10-a, the different color information corresponding to the portion of 5 through 8 pixels is continuously obtained. Although a red color marker is used in FIG. 10-a, a blue color marker can be used in the same way as a red color marker.

The image information corresponding to the prescribed pixel, which is called the target pixel, out of the color information which comes into contact with the color marker, is replaced with the color information of the color marker.

In the case where color image information corresponding to one through 7 pixels is output in the state of being sandwiched between color markers as shown in FIG. 10-b, only the color image information which is sandwiched between color markers and corresponds to the prescribed pixels, in other words the target pixels, can be replaced with the color marker information.

Figure 21:
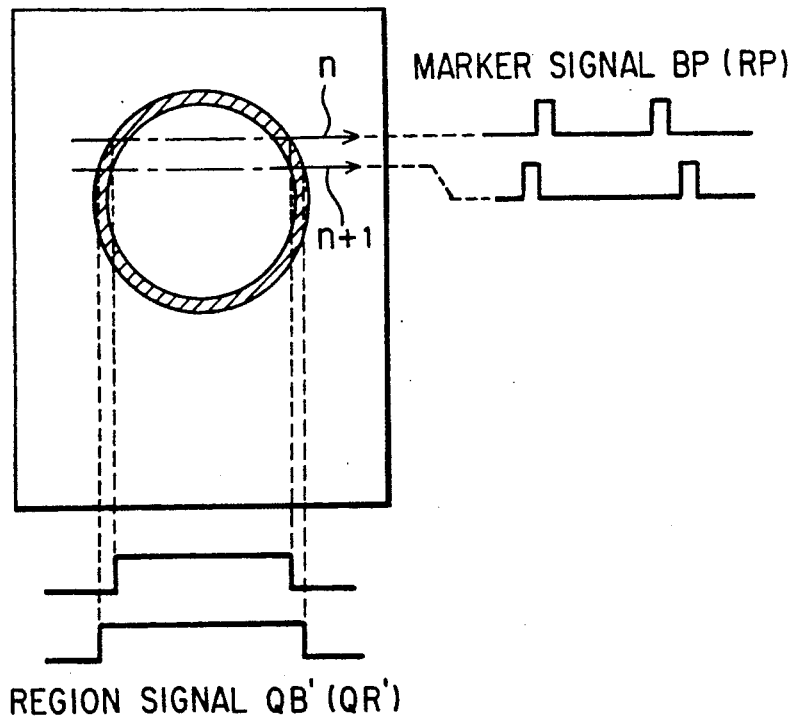

In order to copy the image in the specific region a with the specific color, the marker signals BP, RP, actually the color code data, wherein the signal represents the color marker region as shown in FIG. 21, and the region signals QB', QR' which represent the region a must be detected respectively.

For that reason, the color data selector 50 is installed in the apparatus in addition to the region extracting circuit 60 as shown in FIG. 1. The color data selector 50 is the circuit for selecting the developing color density data corresponding to the copy sequence. In other words it is the developing sequence when the partial color is designated, and it is the circuit for selecting the developing color density data corresponding to the copy sequence when normal copy is conducted.

Figure 11:
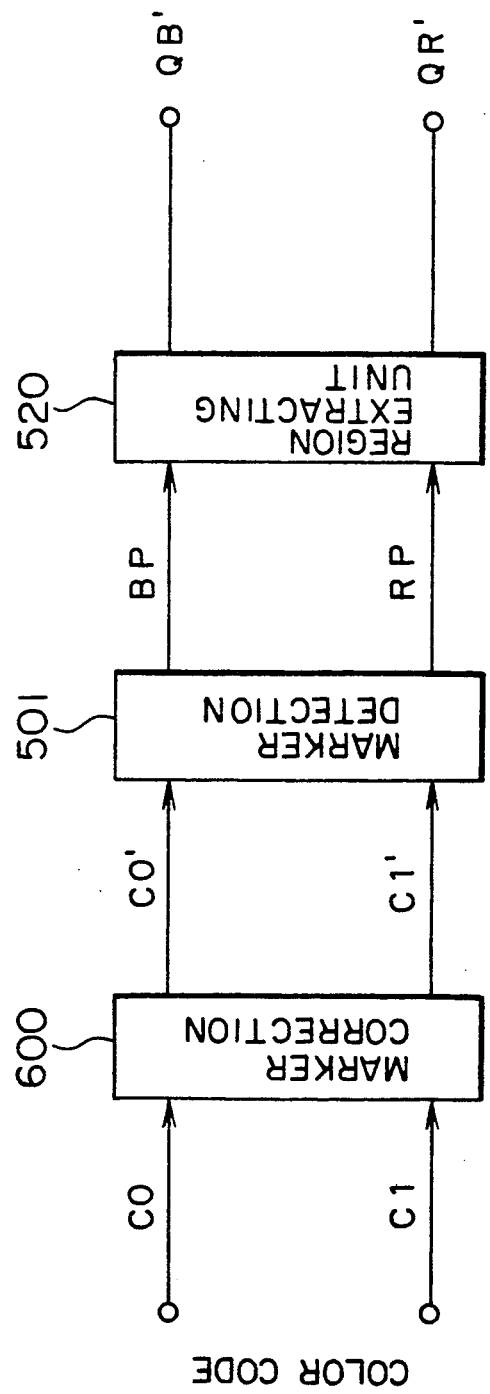
FIG. 11 is a system diagram of the region extracting circuit.

A concrete example of the region extracting circuit 60 is shown in FIG. 11. The bit data of the color code obtained by scanning the color marker, is supplied to the color marker correcting circuit 600 and the color information replacement processing mentioned above is conducted. After the data was processed at the crossing area, the color code data is supplied to the color marker detecting circuit 501 and the data is investigated as to whether a specific color marker is contained in it or not. In the example, this process is applied to two color markers, a red one and a blue one. As a result, two color marker signals, BP and RP, are detected.

The marker signals RP, BP are supplied to the region extracting unit 520 and the region signals QR', QB' indicating the designated region a are output at each scanning line.

The following is a more concrete constitution of the apparatus.

Figure 12:
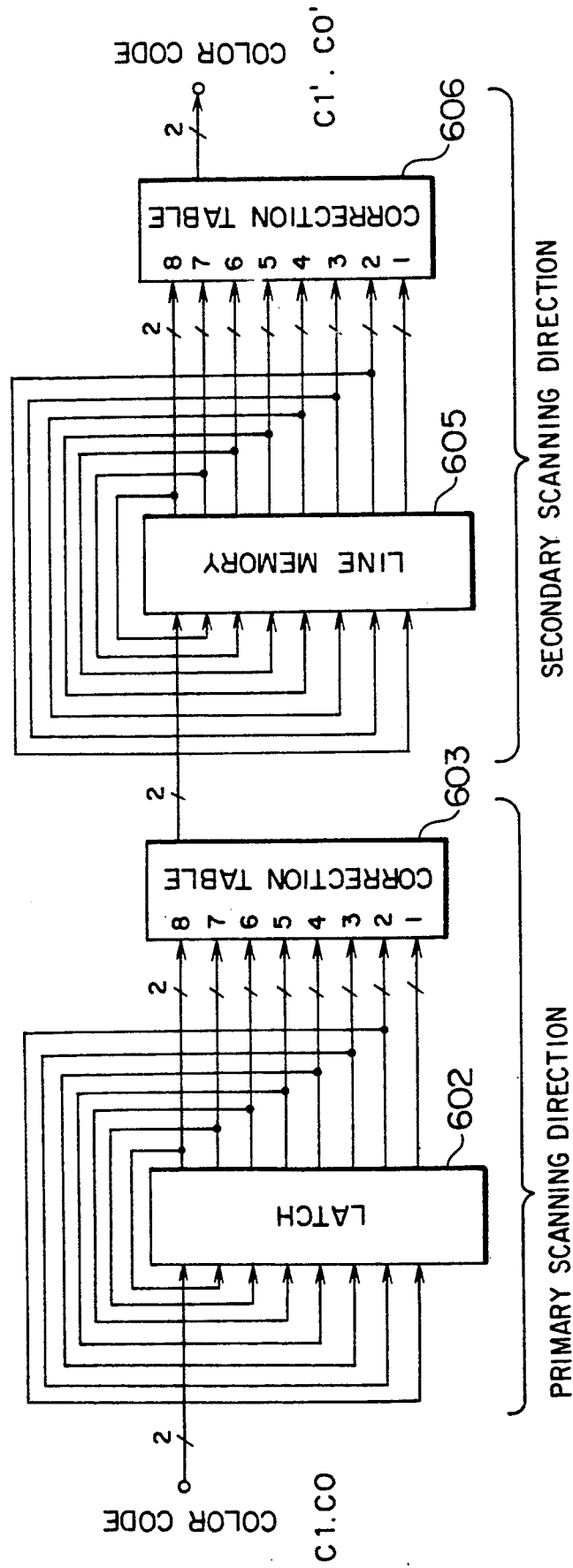
FIG. 12 is a system diagram of the marker correction circuit.

FIG. 12 is one of the examples of the color marker correcting circuit 600. The range of the pixels to be corrected depends on the kind of document to be used. The thickness of ruled lines of an ordinary paper for office use, is 0.2 mm through 0.5 mm and the thickness of a line drawn by a plotter available on the market is 0.2 mm through 0.3 mm. For that reason, the limit of the correcting range is set to 0.5 mm in the example.

As resolution of 16 dot/mm approximately corresponds to 8 pixels, the color pattern shown in FIG. 10 can be considered.

Therefore, the image data corresponding to 8 pixels is converted in parallel with regard to the primary scanning direction and the secondary scanning direction respectively. To attain the object mentioned above, the input color code is supplied to the first stage input terminals of the latch circuit 602. Then, the color code which is output from this, is supplied to the second stage input terminals. The same processing is conducted continuously until the last stage, the eighth stage. By this process, each output terminal can be provided with the output color code which is obtained by shifting the input color code pixel by pixel in order.

By this process, the color codes corresponding to 8 pixels are arranged in parallel and the data is supplied to the correcting table 601. The correcting data is referred in this way.

Concerning the data correcting table 603, the color codes to be used for correction are held in the form of tables in the apparatus, so that the black color code can be changed to the color code of a color marker when the black color code, which is image information, is input as shown in FIG. 10.

Accordingly, when the color markers and color codes of image information are input in the arrangement shown in FIG. 10, all of the black color codes are changed to the red color codes. After the changing process in the primary scanning direction has been finished, the same changing process in the secondary scanning direction is conducted.

Accordingly, the line memory 605 to arrange data in parallel and the correcting table 606 are installed in the apparatus. The correcting table is referred according to the color code data corresponding to 8 lines which are arranged in parallel and the color code data of the checked pixels is changed to the color code data of the color marker.

The color data converting table shown in FIG. 10 is used in this case.

The structure of the line memory 605 is 8-line line memories arranged in tandem.

The latch circuit 602 can be made of 7 latch circuits arranged in tandem.

After the color code changing process has been finished at the crossing area where the color marker crosses a ruled line, the color marker detecting process is conducted.

Figures 13, 14:
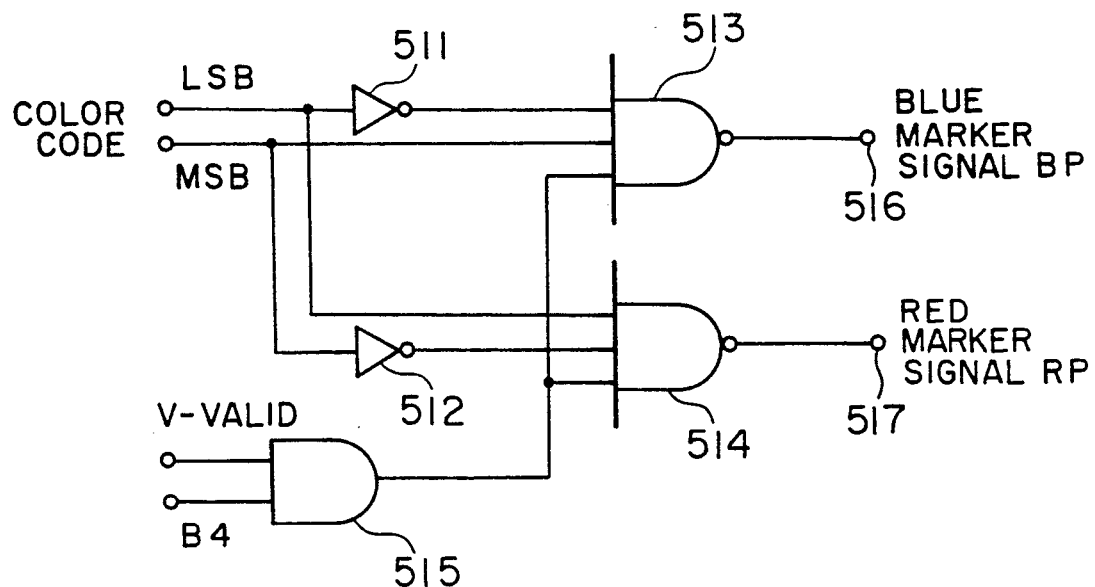
FIG. 13 is a system diagram of the marker detecting circuit.
FIG. 14 is a schematic illustration of the color code data.

FIG. 13 is one of the examples of the color marker detecting circuit 501.

If the relation between the color information and the color code is defined as the table shown in FIG. 14, the color code data of blue is 01 and the color code data of red is 10.

In FIG. 13, the phase of the high-order bit color code data and that of the low-order bit color code data are inverted by the phase inverter 511. The inverted data is supplied to the NAND circuit 513.

In the same way, the phase of the low-order bit data and that of the high-order bit data are inverted by the phase inverter 512. The inverted data is supplied to the other NAND circuit 514. The output of the vertical valid area signal V-VALID and AND output of the size signal B4 are supplied to the NAND circuits 515 and 514 as the gate signal. The numeral represents the AND circuit.

As a result, when the color marker is blue, the blue marker signal BP which has a pulse width corresponding to the thickness of the contour of the color marker, is output from the terminal 516. Refer to FIG. 21.

Similarly, when the color marker is red, the red marker signal RP is output from the other terminal 517. Refer to FIG. 21.

Figure 15:
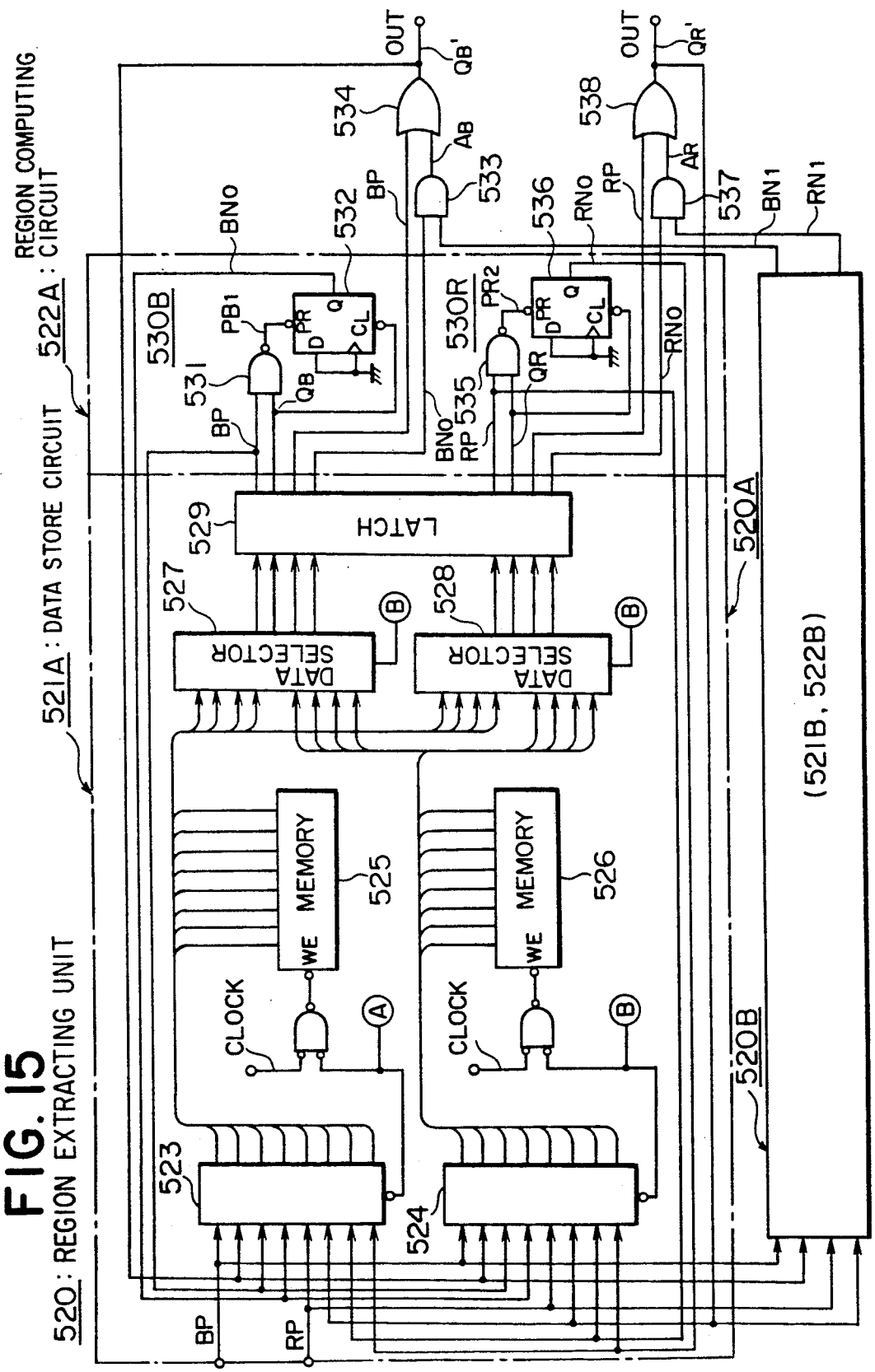
FIG. 15 is a system diagram which shows one of the examples of the region extracting unit.

One of the examples of the region extracting unit 520 is shown in FIG. 15.

The region extracting unit 520 consists of the first and the second region extracting unit 520A, 520B. Each region extracting unit has respectively the data storing circuits 521A, 520B and the region computing circuits 521B, 522B. The first and the second region extracting units 520A, 520B have the function to extract a red marker region in addition to the function to extract a blue marker region.

For the convenience of explanation, the region extraction of the blue marker will be explained below.

In the case where the blue region signal is formed, the region signal of the present scanning line is formed by computation using the region signal obtained scanning immediately before the processing and the marker signal obtained by scanning the present scanning line.

In order to attain the object, the computing process must be conducted in at least three-line periods. Therefore, the first data storing circuit 521A must comprise; the function to store the region signal over a line which is the last data of the scanning line just before the computing process; the function to store the first and the second region signals, actually NAND output, wherein the first and the second signals are formed by the region signal and the marker signal BP which is obtained by scanning the present scanning line; and the function to store the region signal of the present scanning line which is obtained by computing the region signals explained before.

In this example, since the second region signal is formed by reading out the memory in the opposite way, the number of memory to realize the memory function is 16 in total. Furthermore, red markers are needed to be detected. As a result, 32 line memories are needed.

For that reason, the first data storing circuit 521A comprises a pair of memories 525, 526 which are respectively constituted by 8 line memories, in other words 8-bit line memories. Since these line memories are selectively used at each line, a pair of three-state buffers 523, 524, a pair of data selectors 527, 528, and the latch circuit 529 are provided with the apparatus.

The three signals obtained in the first region computing circuit 530B for blue color, are supplied as input signals to the first data storing circuit 521A in addition to the blue marker signal BP.

In the first region computing circuit 530B, the blue marker region signal QB' on the present scanning line n is formed by the region signal QB which is obtained immediately before the computation and the marker signal BP on the present scanning line.

The following is the explanation about the scanning line n shown in FIG. 21, and the relation between the region signal QB, which is the region signal of the scanning line (n −1), and the marker signal BP. These signals are stored in the memory 525 at each line. On the next scanning line (n+ 1), these signals are read out through the data selector 527 and the latch circuit 529. Refer to FIG. 16 D, E.

A pair of signals QB, BP are supplied to NAND circuit 531, the preset pulse $PB_1$ whch is shown in FIG. 16, is supplied to the preset terminal PR of the D-type flip-flop 532, and the region signal QB just before the computation is supplied to the clear terminal CL. As a result, the first NAND output $BN_o$, which is the first contour signal, is obtained.

The first NAND output $BN_o$ and the marker signal BP are stored in the memory 526 in order. Therefore, on the scanning line (n+1), the three-state buffer 524 is activated. The same processing is also conducted in the second region extracting unit 520B at the same timing. But the installed memories are all address-controlled so that they are written in in the normal direction and read out in the reverse direction. Accordingly, the output timing of the marker signal BP and the region signal QB obtained just before the computation, is W1 on n line. But it is W2 on (n +1) line. So, it is read out a little earlier. Refer to FIG. 16 H, I. As a result, the output $BN_1$ of the second NAND becomes K shown in FIG. 16. The marker signal BP and the second NAND output $BN_1$ are stored again in the data storing circuit 521B.

On the next scanning line (n+1), the first NAND output $BN_o$, the marker signal BP, and the second NAND output $BN_1$ are read out. Refer to FIG. 16 L, M.

As explained before, the memory installed in the second region extracting unit 520B, is written in the normal direction and read out in the reverse direction. Therefore, the reading out timing $W_3$ of the first NAND output $BN_1$ and the reading out timing $W_4$ of the second NAND output $BN_2$ coincide with each other.

Both of them are supplied to AND circuit 533 and OR output QB' shown in FIG. 16 P, and can be obtained by the operation AND output AB and the marker signal BP are supplied to OR circuit 534. Refer to FIG. 16 N, O concerning AND output AB and the marker signal BP.

This OR output QB' is the signal which indicates the area within the contour of the blue marker drawn on the present scanning line n. In other words, this OR output is the region signal QB' of the present scanning line.

It is clear that the region signal QB' is fed back to the data storing circuit 521A, 521B in order to use the signal as the region signal QB on the next scanning line.

In this way, the marker region is accurately detected by using a pair of NAND outputs $BN_o$, $BN_1$ which are obtained by reversing the direction of reading out the memory.

Detecting a red marker is conducted in the same way as a blue one. Therefore, an explanation about the region computing circuit 530R is omitted here. However, the numeral 535 is a NAND circuit, the numeral 536 is a D-type flip-flop, the numeral 537 is an AND circuit, and the numeral 538 is an OR circuit. OR' represents the red marker region signal.

The reason why the three-state buffers 523, 524, the memories 525, 526, and the data selectors 527, 528, are provided respectively in pairs, is so that the data storing circuit 521A can conduct memory reading and writing simultaneously.

Therefore, these are selected to read or to write alternatively by 2-line cycle selection signals supplied to terminals A and B.

The region signals QB' and QR' supplied to the output terminals are supplied to the region determining circuit 540 as shown in FIG. 40.

Figure 19A:
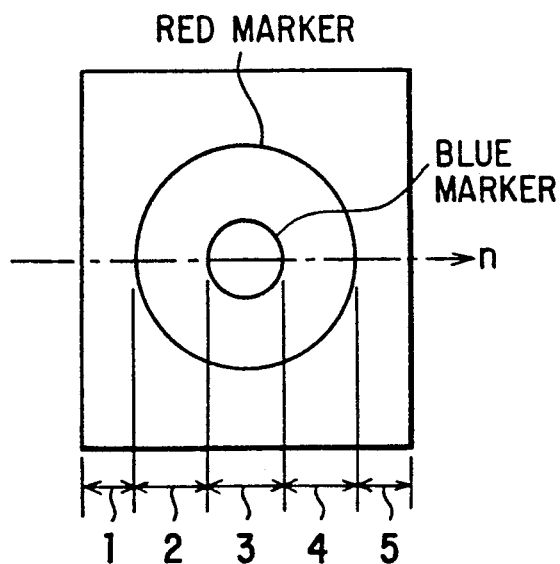
FIG. 19 is a drawing which shows the relation between the color marker and the recording region.

The region determining circuit 540 is a control means for the region signal used to record images as shown in FIG. 19, if the marker designation is similar to one shown in FIG. 19A.

In the periods I and V of the figure, white/black images, is recorded, while in the periods II and IV, a black image is recorded as a red image. In the period III, a black image is recorded as a blue image by allowing density data gate signal S to be formed from region signals QB' and QR'.

As shown in FIG. 17, the region determining circuit 540 has four flip-flops 541 through 544. Region signals QB' and QR' latched by the forward flip-flops 541, 542 are supplied to their corresponding NAND circuits 545 through 548. To each of the NAND circuits 545 through 548, color code data C indicating black color is supplied via the AND circuit 554. On the other hand, to the switching circuit 553, the scan code signal is supplied which shows that the copying operation is finished, and in which color.

With A to C signal shown in FIG. 18, the first AND circuit 545 provides the first NAND output M1 as shown in FIG. 18D. Likewise, the second NAND circuit 546 provides the second NAND output M2 shown in FIG. 43G based on the E, F input signals in FIGS. 43E, 43F. As a result, the AND circuit 551 provides the gate signal $S_1$ related to the period III shown by H in FIG. 18.

Similarly, J to K input signals in FIG. 18, provide the third NAND output $M_3$ of FIG. 18L, while input signals in FIG. 18M and N provide the fourth NAND output $M_4$ in FIG. 18-O. As a result, the second AND circuit 552 provides the gate signal $S_2$ (FIG. 18P) related to the periods II and IV.

With Q to S signals in FIG. 18, the fifth NAND circuit 549 provides the gate signal $S_3$ (FIG. 18T) corresponding to the periods I and V.

One of the gate signals $S_1$ to $S_3$ is selected by the switching circuit 553 corresponding to the scan code signal that indicates the copy sequence. Accordingly, the gate signal $S_1$ is selected for blue color recording mode, while the gate signal $S_2$ is selected for red color recording mode. Likewise, gate signal $S_3$ is selected for black color recording mode.

The operation explained above is conducted when the process indicating signal CC is the partial color conversion mode. When other modes are selected, the apparatus is controlled by the color code and scan code.

Gate signals $S_1$ to $S_3$ which are output from the switching circuit 553, are supplied to the density data selection circuit 574 shown in FIG. 17, and the density data corresponding to the color code, is selected.

Figure 19B:
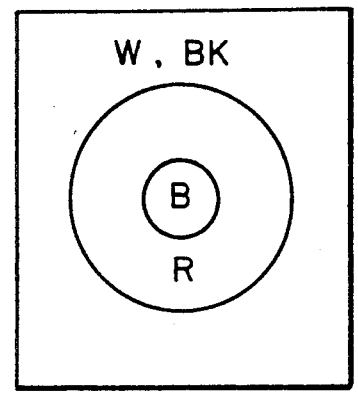
Figure 20A:
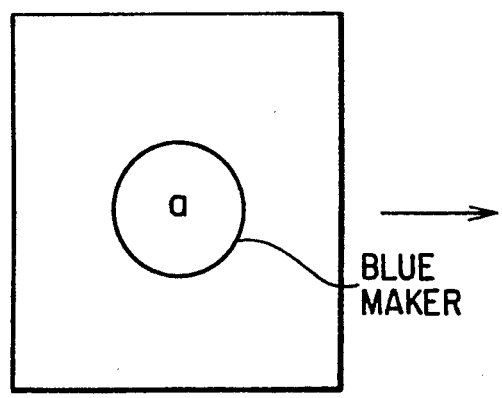
FIG. 20 and FIG. 21 are schematic illustrations to explain the partial color conversion processing of the invention.
Figure 20B:
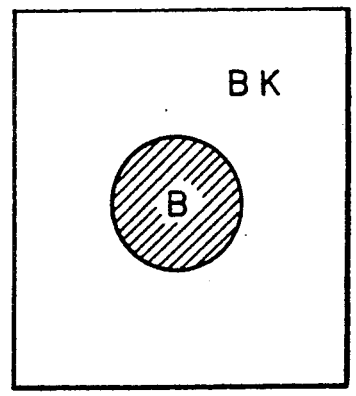

In this case, white density data of white color, which is always 1, is selected in the period outside the period where there is no gate signal S. One example of this is that white data is always selected outside the period III in the blue color recording mode. As a result, blue image is recorded in period III alone in the blue recording mode, while red image is recorded in period II and IV in the red recording mode and periods I and V are recorded in black color in the black recording mode (FIG. 19B).

The density data is delayed by the delay control circuit 575, and the delayed time amounts to 8 lines. The delayed density data is input to the selecting circuit 574. The reason for delaying the density data is that the color marker data is changed in the direction of the secondary scanning. so it is necessary to adjust the density data timing in accordance with the color marker data.

In this way, by the means of installing the region judging unit 540, even in a double-designated region the color of an inside color marker has priority over other colors. The region where color designation is not double, is copied with the designated color.

A variation of partial color conversion is explained as follows.

Partial color conversion comprises detecting the designated region and processing of image data or color within the designated region. Therefore, the partial color conversion mode can be used for extracting the partial region, erasing, deleting, reversing, mirror image, magnifying, reducing, position transferring, and optional combinations of them. It is possible to determine the content of processing beforehand and conduct the predetermined processing in the detected region.

Red and redlike colors such as orange and pink, or blue and bluelike colors are adequate, as those colors are hard to copy in the usual copy mode.

When a color marker can not be drawn on a document directly, the same effect is obtained if a marker is drawn on a transparent sheet.

As mentioned above, according to the present invention, the color information of a document which comes into contact with the color information to designate the region, is changed to the region designating color information.

According to the invention, the color marker information which is hidden by the document color information, is positively compensated. Accordingly, it has a characteristic that the designated region of a color marker is accurately detected. Therefore, correct color conversion is conducted.

Furthermore, according to the invention, the document color information sandwiched between the color information which designates the region, can be changed to the color information to designate the region.

In this case, the color information in which one side of the image contour comes into contact with the color marker, is not changed. Therefore, for instance, in case where a color marker is set coming into contact with a horizontal line, the color marker is not changed in the range of the horizontal line region.

Accordingly, the invention is well fitted for a color image processing apparatus such as a color copier.

What is claimed is:

1. An image processing apparatus, comprising:
    means for pixel by pixel conversion of color image information as a document into a color image signal, the color image on the document including a marking color designating a region of the document;
    means for classifying said color image signal for each pixel into a signal selected from a first signal indicating a document color and a second signal indicating the marking color;
    means for correcting the signal classified by the classifying means, the correcting means including a correcting table which stores a plurality of color patterns, each of which patterns represents the color of a predetermined number of pixels, the correcting table including means for outputting a predetermined corrected color signal corresponding to each of the color patterns; and
    means for detecting the region using the second signal and the signal output from the correcting table.

2. The image processing apparatus of claim 1, wherein the correcting table is for correction in a primary scanning direction, and wherein the correcting means further includes a correcting table correction in a secondary scanning direction, the correcting table for the secondary scanning direction storing a plurality of color patterns and including means for outputting a predetermined corrected color signal corresponding to each of the color patterns.

* * * * *

UNITED STATES PATENT AND TRADEMARK OFFICE
CERTIFICATE OF CORRECTION

PATENT NO. : 5,130,791

DATED : July 14, 1992

INVENTOR(S) : Yoshinori Abe

It is certified that error appears in the above-identified patent and that said Letters Patent is hereby corrected as shown below:

Claim 1, column 14, line 17, change "as" to --on--.

Signed and Sealed this

Twelfth Day of October, 1993

Attest:

BRUCE LEHMAN

Attesting Officer

Commissioner of Patents and Trademarks